3,738,974
LIQUID PHASE PROCESS FOR THE POLYMERIZATION OF UNSATURATED MONOMERS
Masaaki Takehisa, Shiro Senrui, Hirondo Kurihara, Yoshio Maruyama, Hiromasa Watanabe, Hayato Nakajima, Masamichi Touhei, and Takeo Simada, Takasaki, Takesi Suwa, Sawa-gun, Yoshio Takasaka, Yokkaichi, and Hideyuki Hashiba, Itami, Japan, assignors to Japan Atomic Energy Research Institute, Tokyo, Japan
Filed Nov. 16, 1970, Ser. No. 89,846
Claims priority, application Japan, Nov. 20, 1969, 44/92,469
Int. Cl. C08f 1/16, 1/60, 1/98
U.S. Cl. 260—89.5 AW    11 Claims

ABSTRACT OF THE DISCLOSURE

In a process for polymerizing a monomer or monomers selected from an olefin and a vinyl monomer in the presence of an aqueous organic medium, adherence of the resulting polymer to the inside walls of the polymerization reactor is prevented by having a particular medium composition flow down in such a manner that said composition covers said inside walls. Said composition comprises a small amount of a monomer or monomers and a mixture consisting of substantially the same components as said aqueous organic medium. Said composition may typically be represented by a composition comprising a small amount of an olefin and/or a vinyl compound, water, and an organic medium such as a lower-alkanol, which is in physico-chemical equilibrium state with a reaction composition comprising an olefin and/or a vinyl compound, said organic medium and a small amount of water.

BACKGROUND OF THE INVENTION

(1) Field of the invention

This invention relates to an improved technique for polymerization or copolymerization of ethylene or an olefine having unsaturated end groups and/or a vinyl compound, in which a medium comprising an organic compound and water is used, and particularly relates to inhibiting the sticking (adherence) of the polymerization products to the inside walls of the polymerization reactor by using a medium of particular composition.

(2) Description of the prior art

The polymerization reaction of a compound having at least one $CH_2=C<$ group is exothermic, and it is necessary to cool the reactant mixture in order to get a well controlled reaction condition. In a batch reactor, the cooling of the mixture is usually performed by circulating a thermal medium in the jacket built in the reactor, or by circulating the reactant mixture into a heat exchanger installed on the outside of the reactor. During cooling, the reactant mixture is usually stirred enough to keep the temperature distribution in the reactor substantially uniform.

When polymer sticks to the inside wall of the reactor or to the heat transfer surface of the heat exchanger in such a polymerization reaction, efficiency of the reactor is inevitably diminished; that is, interrupted; the total heat transfer of the reactor is reduced because of low heat conductivity of the polymer, the effective internal volume of the reactor is reduced because of sticking of the polymer and the fluid resistivity in the tubes of the heat exchanger increases. Moreover, when the polymer stuck to the walls is removed during operation of the reactor by means of scraping in order to keep the quantity of the sticking polymer, which increases as operation time proceeds, within a certain limit, the product becomes a mixture comprising polymers having various properties and its commercial value is lowered.

In order to remove the disadvantage resulting from the formation of scale which consists of thus formed polymers, it has been necessary to stop the operation of the reactor and to take such steps as manual scraping of the adhering polymers, peeling it off by means of water under high pressure or if required dissolving it in a suitable solvent.

The disadvantages of the above-described cleaning operation are: (i) many man-hours and much time are required; (ii) even a continuous polymerization reactor is reduced to working on a semi-batch basis and the productive capacity of the reactor is lowered; and (iii) a product of low commercial value is formed by repeated starting and stopping of the reactor. The sticking of polymers has been a serious problem. A method in which a small amount of chemical reaction inhibitor is added to the monomer (for instance, Japanese patent publication No. 1,544/56 and a method in which the sticking polymer is mechanically scraped off (for instance, Japanese patent publication No. 2,645/65) and the like have been proposed to solve the problem. Moreover, the method in which an antisticking medium comprising another component which is immiscible with the polymerization medium such as hydrocarbon, water and the like is flowed down along the inside wall of the reactor, has also been proposed. In this method, however, it is difficult to separate the hydrocarbons from the polymer because of their high affinity and it is feared that the hydrocarbons will hinder the promotion of polymerization, and water is not so effective because of the low wettability of the inside wall of the reactor.

SUMMARY OF THE INVENTION

The present inventors found that the sticking of polymer to the inside wall of the reactor was initiated by the contact of the active species for polymerization existing in the reactor with the wall, and confirmed that prevention of the sticking was accomplished by preventing said active species from contacting the wall, and have finally reached the present invention through the application of an anti-sticking medium having a particular composition. The principal object of this invention is the prevention of sticking of polymers, and other objects and advantages will be obvious from the following descriptions.

The disadvantages caused by the sticking of polymers described above can be eliminated by using a medium composition of which has the following characteristics; (I) being in equilibrium physicochemically with a polymerizable reaction composition (a mixture comprising a polymerizable monomer or monomers, an organic medium and water), (II) the solubility of the polymerizable monomer in said medium composition in equilibrium state being low enough not to cause substantial polymerization, and (III) having lower affinity with the formed polymer than with said reaction composition. Said medium composition has substantially the same components as that of the reaction composition but a different mixing ratio, and its flow down is controlled so as to wet and cover the inside surface of the reactor. The problems caused by the sticking of polymer can be solved or the above mentioned object can be substantially achieved by the applications of the above described method and the equipment to a reactor in which polymerization reaction is being carried out to prevent the formed polymer from sticking to the inner surface of the reactor.

The present invention was experimentally applied to the polymerization of ethylene in a continuous flow system by means of an ionizing radiation and can also be applied to a batch system polymerization process. One of the most important applications of the invention is in connection with a polymerization reaction carried out at a temperature below the melting point of polyethylene, particularly a polymerization reaction by means of an ionizing radiation.

DESCRIPTION OF THE PREFERRED EMBODIMENTS

Figure 1:
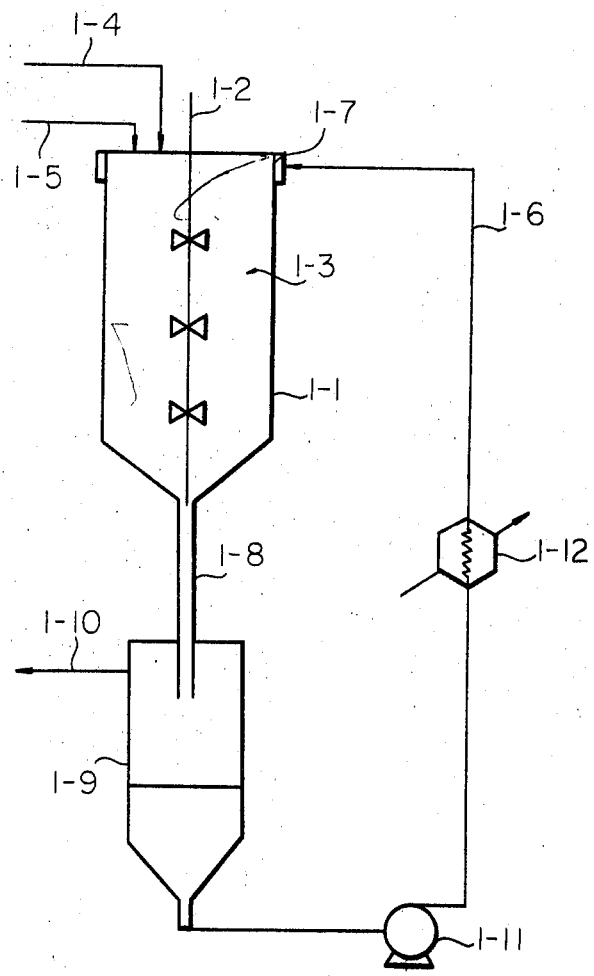
FIG. 1 shows a schematic diagram which gives an embodiment of the equipment adapted for this invention.

FIG. 1 shows a schematic layout of the polymerization reactor with a flow system according to this invention. A shaft for stirrer (1–2) is installed in the reactor (1–1). Stirring vanes (1–3) are attached to the shaft, which is revolved at the rate of, for instance, 300 r.p.m. (An electric motor is not shown in this layout.) The monomer and medium are supplied to the reactor through three sets of inlet piping, the first (1–4) is for compressive introduction of polymerizable monomer, ethylene, the second (1–5) is for the aqueous solution, for instance, mainly composed of tert-butyl alcohol which is the medium for the polymerization reaction and the third (1–6) is for the medium composition, for instance, comprising water, as the main constituent, tert-butyl alcohol and a small amount of ethylene, which is physicochemically in equilibrium with the polymerizable reaction composition. The downward flow of the medium composition is controlled so as to wet and cover the inner surface of the reactor. In the example shown in FIG. 1, the medium composition which is introduced with pressure through a pipe (1–6) runs over a weir (1–7) fitted in a circle along the inside wall of the reactor, and wets the surface of the wall. Besides the above, other reasonable methods such as seepage of the medium composition through a spongy material, scattering of the medium composition by a turning disc and the like are applicable for this purpose. The polymerizable monomer is polymerized by means of the irradiation with an ionizing radiation or the decomposition of a radical initiator or the combined use thereof, and the resulting polymer is dispersed into the reaction composition to form a slurry comprised of fine particles. The slurry which consists of the reaction composition and the formed polymer is mixed with the medium composition which is physicochemically in equilibrium with the reaction composition, through the outlet pipe of the reactor (1–8), and is poured into a separator (1–9). The slurry separates from the medium composition in the separator, owing to the difference in their specific gravities. The separated medium composition does not contain the formed polymer at all because the medium composition has lower affinity with the polymer than with the reaction composition. The polymerized products are taken out from the separator through a nozzle and then the formed polymer is separated from the products and unreacted monomer is recovered, but the layouts for these after-treatments are not shown. The medium composition in the separator is circulated into the reactor by a circulating pump (1–11) through a heat exchanger (1–12).

Figure 2:
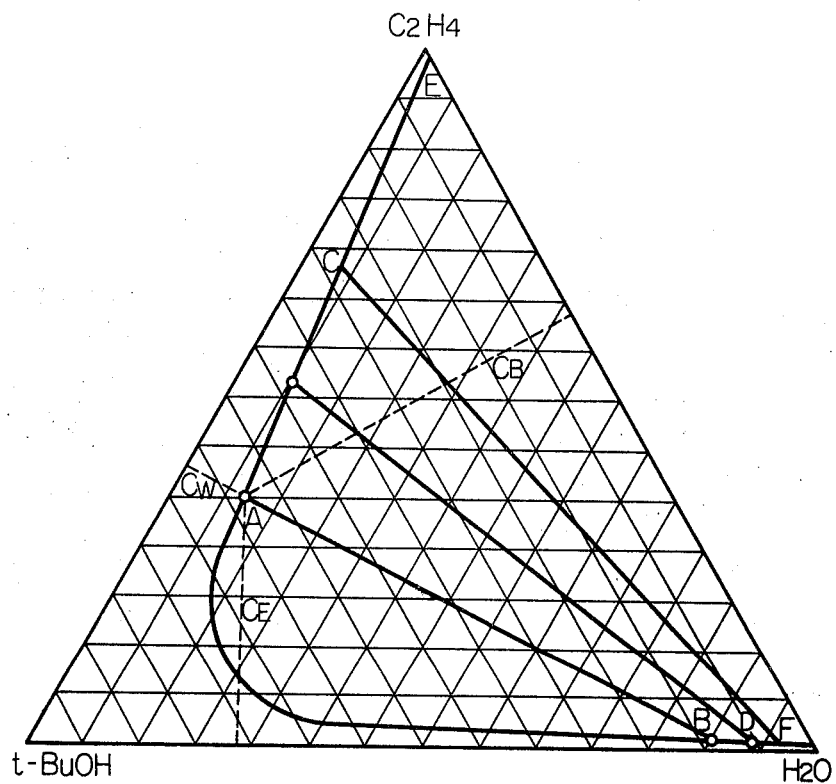
FIG. 2 shows an example of the composition equilibrium diagram for a three component system comprising monomer, organic medium and water for clear understanding of this invention.

The medium composition which is physicochemically in equilibrium with the polymerizable reaction composition is explained below, since it is the essential feature of this invention. FIG. 2 gives the relationship between the concentrations of each component in the system comprising aqueous solution of tert-butyl alcohol and ethylene in which the polymerizable reaction composition and the medium composition are physicochemically in equilibrium under the pressure of 400 kg./cm.$^2$ at 25° C. That is, any point in the triangular plot shown in FIG. 2 represents a composition of ethylene, tert-butyl alcohol and water; for instance, the composition of these components at point A is represented by the ratio in the lengths of $C_E$, $C_B$ and $C_W$. The composition at point B is represented in the same manner as in point A. Furthermore, the curved line ECABDF represents the boundary-line between the phases formed by the three components mentioned above. The left area of the line represents a homogeneous phase comprising tert-butyl alcohol, water and ethylene and the right represents the area in which two phases consisting of three-component solution, one with little and one with much water, coexist separately. Straight line segments AB, CD and the like which are formed by connecting two points on the curved line ECABDF, are called "tie-line," and represent the composition of the solution in which two solutions, i.e. polymerizable reaction composition (three-component solution with less water, e.g. point A) and the medium composition (three-component solution with much water, e.g. point B), are in a concentration equilibrium. That is, when the polymerizable reaction composition has a composition at point A ($C_E$, 35; $C_B$, 55; $C_W$, 10 weight percent), the medium composition is in equilibrium should have a composition at point B ($C_E$, 1; $C_B$, 13; $C_W$, 86 weight percent). For instance, the mixture having a composition represented at one point on the tie-line AB is isolated into two phases having the compositions represented at points A and B respectively. Since the concentration of ethylene (polymerizable monomer) in the medium composition having the composition at point B is very low, no substantial polymerization reaction takes place in the medium composition.

The relationships in a concentration equilibrium as shown in FIG. 2 come into existence not only for the system comprising ethylene, tert-butyl alcohol and water but also for many other systems. Some of the systems have been reported by Joseph C. Elgin et al. [Journal of Chemical and Engineering Data, 4 (No. 1) 3 (1959)].

Figure 4:
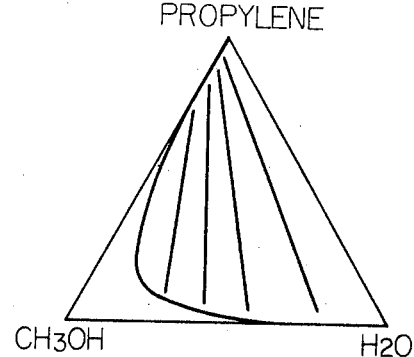
FIGS. 4, 5 and 6 show sketches of other composition equilibrium diagram respectively, which illustrate the relationships between compositions in equilibrium applicable to this invention.
Figure 5:
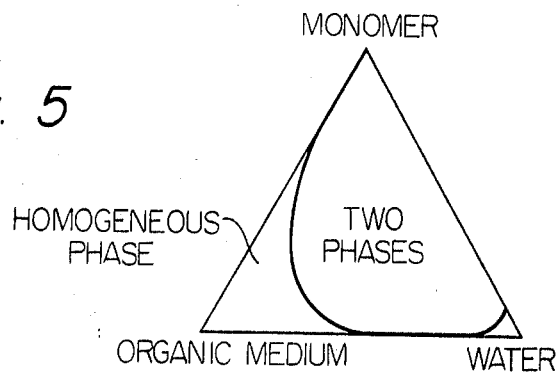
Figure 6:
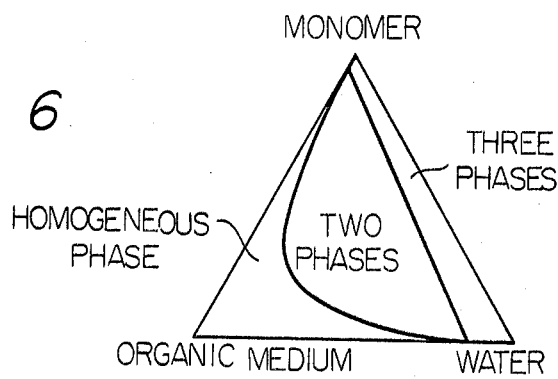

FIG. 4 shows a sketch of the concentration equilibrium diagram for the system comprising methanol aqueous solution and propylene, and represents the relationship between the concentration of polymerizable reaction composition under the pressure of 400 kg./cm.$^2$ at 25° C. and that of the medium composition being physicochemically in equilibrium with the reaction composition. The composition equilibrium diagram of this system is substantially the same as that shown in FIG. 2, and the explanation on this diagram can be omitted since the explanation on FIG. 2 is applicable. FIG. 5 and FIG. 6 are sketches of the phase diagram of three-component systems applicable to this invention. When a polymerizable reaction compound and a medium composition satisfy the conditions (I), (II) and (III) previously mentioned, these are obviously applicable to this invention, and FIG. 5 and FIG. 6 show other typical forms of the diagram. The left area of the curved line in FIG. 6 represents a homogeneous system comprising the reaction medium, water and the polymerizable monomer, and the center zone marked as two phases is the area in which two phases coexist, consisting of three-component solutions with little and much water. The area on the right side of the diagram marked as three phases represents a heterogeneous phase comprising three components. Therefore, when the components form an equilibrium state as shown in FIG. 6, it is necessary to adjust the mixing ratio of the reaction medium, water and monomer in the system, to be within the area in which the solution is isolated into two phases.

Typical organic mediums which form each equilibrium mentioned above under a centain pressure, in a system comprising an organic medium, water and an olefinic monomer, are illustrated as follows; acetoaldehyde, ethyl alcohol, isopropyl alcohol, methanol, $\beta$-oxyethylmethyl ether, morpholine, acetone, acetonitrile, acetic acid, propionic acid, n-propyl alcohol, tert-butyl alcohol, pyridine, trimethylamine, triethyl phosphate, sec-butyl alcohol, methylal, methyl ethyl ketone, propionaldehyde, etc.

Figure 3:
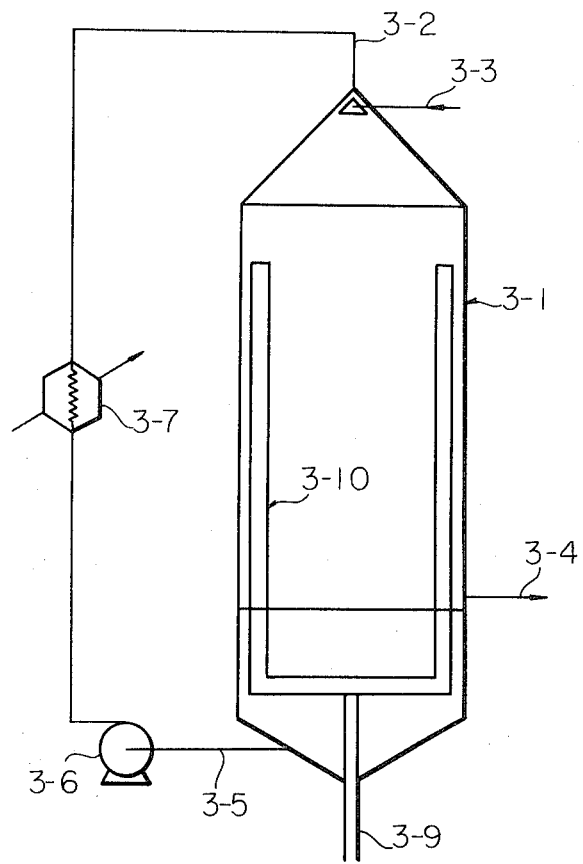
FIG. 3 shows a schematic layout which gives another embodiment of the equipment adapted for this invention.

The technical conception which is necessary to carry out this invention will easily be understood by those skilled in the art, based on the above explanations and from FIG. 1 and FIG. 2, and the invention can also advantageously be applied with the modified method shown in FIG. 3. The inside wall of the reactor is wetted and covered by the medium composition which is introduced with pressure through inlet tube (3–2) at the top of the upper cone of the reactor (3–1). The polymerizable reaction composition is introduced into the reactor under pressure through tube (3–3). The polymerization reaction is initiated in the polymerization reactor (3–1) by means of an ionizing radiation or a radical initiator mixed in the polymerizable reaction composition which is introduced through the tube (3–3), and the polymerized product is withdrawn through outlet tube (3–4) of the reactor and sent to the next process. On the other hand, the medium composition is withdrawn through tube (3–5), and circulated to the reactor through heat exchanger (3–7) and tube (3–2) by means of circulating pump (3–6). The lower end of the shaft of a scraping machine (3–9) and the scarper blades (3–10) are immersed in the medium, therefore, the polymerized product does not stick to these parts. The use of a scraping machine does not constitute an essential feature of this invention, and the factors involved in selecting the shape of the scraping blades for polymerization reactor etc. are well known to those skilled in the art. Therefore, detailed explanation of these factors is omitted here. However, the use of these techniques together with the method of this invention make it easier to attain the improved efficiency in attaining the object of the present invention. Moreover, it is desirable to apply the technique of this invention to the surfaces of solid bodies such as the shaft, which constitute a part of the reactor, since the polymerized product sticks to such surfaces as well as to the inside wall of the reactor.

Furthermore, the present invention can be more effectively applied by adding a water soluble inorganic compound or a water soluble ionic salt of an organic compound which acts as a polymerization inhibitor in the medium composition, since the medium composition used in this invention contains a large amount of water and the polymerizable reaction composition contains a small amount of water. The organic compound includes nitrates, nitrites, ferric salts, iron cyanates, stannic salts, thiosulfates, phosphoric acid, etc., and the details of such compounds are described in Japanese application No. 17,897/69 by the present inventors. Those skilled in the art may easily select the inorganic compound, the ionic organic compound and a mixture thereof as a polymerization inhibitor and determine the amount of these inhibitors suitable to be added.

The characteristics and techniques of this invention have been explained above, and this invention can advantageously be applied to the polymerization reaction in which polymerized products precipitate in the course of the reaction and also to the copolymerization reaction of similar system.

It is necessary that the medium composition to be used in the invention, which flows down over the inside surface of the reactor, be physicochemically in equilibrium with a liquid reaction medium in the presence of a polymerizable monomer or monomers; and the affinity of the medium composition for the polymerized solid product is lower than its affinity for the polymerizable reaction composition and the solubility of the polymerizable monomer in the medium composition in equilibrium state is so low that the dissolved monomer is not substantially polymerized.

Therefore, the modes of practice of the invention can be summarized as follows. In polymerization or copolymerization of an olefin and/or a vinyl compound in which a liquid medium comprising an organic compound and water is used, (1) the medium composition is in equilibrium with the polymerizable reaction composition (for instance, a mixture comprising tert-butyl alcohol, water and ethylene) comprising the reaction medium (for instance, aqueous solution containing 84 weight percent of tert-butyl alcohol and the polymerizable monomer (for instance, ethylene), (2) the affinity of the medium composition for the polymerized solid products (for instance, polyethylene) is lower than its affinity for the polymerizable reaction composition, (3) the solubility of the polymerizable monomer in the medium composition in equilibrium state is so low that the dissolved monomer is not substantially polymerized and (4) the medium with the following composition is flown down over the inner surface of the reactor in the course of polymerization reaction, preferably with circulation; said medium composition (for instance, a composition comprising tert-butyl alcohol, 24; water, 75; ethylene, 1 weight percent respectively) consists of a small amount of polymerizable monomer or monomers and a mixture selected from the group consisting of the mixture having substantially the same components as the reaction medium but different mixing ratio (for instance, aqueous solution containing 24 weight percent of tert-butyl alcohol) and the mixture in which a water-soluble compound is added thereto (for instance, a composition comprising aqueous solution containing 24 weight percent of tert-butyl alcohol and a small amount of inorganic compound as polymerization inhibitor).

In polymerization or copolymerization of an olefin and/or a vinyl compound, the use of various liquid polymerization mediums is well known in the art. Therefore, based on the technical thoughts and scope of this invention, those skilled in the art can easily select a suitable liquid reaction medium and the medium composition which has an equilibrium relationship satisfying the requirements of this invention, with reference to the descriptions in this specification, the relationship in the concentration equilibrium shown in FIG. 2 and FIGS. 4–6, and the descriptions in Journal of Chemical and Engineering Data previously mentioned. In this specification, moreover, the relationship in concentration equilibrium for three-component systems is illustrated, but it is obvious that the invention is also applicable to four-component systems if the system satisfies the technical thoughts of this invention.

Typical examples of a polymerizable monomer are ethylene, propylene, 1-butene, vinyl halides (for instance, vinyl chloride or vinyl fluoride), acrylonitrile, vinyl acetate, styrene, vinylidene chloride, a lower-alkyl methacrylate and a lower-alkyl acrylate, etc., and the invention can be advantageously applied to a process for producing a polymer or copolymer which is insoluble in its monomer or monomers and its polymerizable reaction composition.

When polymerization reaction is carried out under irradiation with an ionizing radiation, cross-linking and graft-polymerization proceed because the polymerized product sticking to the inner surface of the reactor is always exposed to the radiation, and finally, the polymerized product forms infusible and insoluble blocks and sometimes becomes a great obstacle to the continuous operation required for industrial purposes. The techniques of this invention are particularly effective in the cases mentioned above.

The invention is further illustrated by means of some preferred examples and reference examples, and the invention should not be limited by these examples. It should be understood that changes and modifications within the spirits and scope of the invention can be effected.

Reference Example 1

Ethylene was introduced with stirring into a tank reactor with a stirrer having an inside volume of 10 liters, under a pressure of 400 kg./cm.$^2$, at 30° C. and at a flow rate of 28 kg./hr., and exposed to an irradiation of gamma rays from Co-60 of 100,000 curies at a dose rate of $3.7 \times 10^5$ rad/hr. Thus, powder polyethylene having molecular weight of $7 \times 10^4$ and density of 0.939 g./cm.$^3$, was produced at the rate of 80 g./hr. After continuous operation for 34 hours, the quantity of polymer sticking to the inner surface of the reactor was 0.50 g./cm.$^2$. The stuck polymer was cross-linked polyethylene and was insoluble in hot Tetralin; it adhered so strongly that it was impossible to peel off without a burin.

Reference Example 2

Ethylene was introduced with stirring into a tank reactor with a stirrer having an inside volume of 10 liters, under a pressure of 400 kg./cm.$^2$ at a flow rate of 4.5 kg./hr., and, at the same time, an aqueous solution of tert-butyl alcohol with a concentration of 60 weight percent was flowed down over the inner surface of the reactor at the rate of 37 liter/hr., and exposed to an irradiation of gamma rays from Co-60 of 100,000 curies at a dose rate of $2.0 \times 10^5$ rad/hr. at 30° C. Thus, fine powder polyethylene having a molecular weight of $3 \times 10^4$ and a density of 0.940 was produced at the rate of 75 g./hr., in the state of suspension in the aqueous solution of tert-butyl alcohol. After continuous operation for 8 hours, the quantity of polymer sticking to the inner surface of the reactor was 0.02 g./cm.$^2$ on the average. The stuck polymer was so soft that it could be removed with the fingers.

Example 1

A tank reactor with an inside volume of 10 liters, a separator with an inside volume of 45 liters and a circulating pump with the capacity of 300 liters/hr. were used in an arrangement as shown in FIG. 1. The apparatus was resistant to pressure higher than 400 kg./cm.$^2$. Ethylene and an aqueous solution of tert-butyl alcohol with the concentration of 84 weight percent were flowed into the reactor at the rates of 3.1 kg./hr. and 14.3 liters/hr. respectively. A polymerizable reaction composition was obtained in homogenous phase by mixing the above liquid materials. Stirring in the reactor was not employed in this experiment. A medium composition (consisting of water, 75; tert-butyl alcohol, 24; ethylene, 1 weight percent respectively) being in concentration equilibrium with the polymerizable reaction compositions was flown down along the inner surface of the reactor at a flowrate of 200 liters/hr., simultaneously with the introduction of the reaction compound. Irradiating gamma rays from Co-60 of 100,000 curies at a dose rate of $2.0 \times 10^5$ rad/hr. under a reaction pressure of 150 kg./cm.$^2$; thus, fine powder polyethylene with a molecular weight of $3.5 \times 10^4$ and a density of 0.942 was produced at the rate of 65 g./hr. in the state of suspension in the aqueous solution of tert-butyl alcohol. After continuous operation for 40 hours, the quantity of polymer sticking to the inner surface of the reactor was very small and could not be measured quantitatively.

Example 2

A tank reactor with an inside volume of 10 liters, a separator with an inside volume of 45 liters and a circulating pump with a capacity of 300 liter/hr. were used culating pump with a capacity of 300 liters/hr. were used proof against a pressure higher than 400 kg./cm.$^2$. Ethylene and an aqueous solution of tert-butyl alcohol with the concentration of 84 weight percent were flown into the reactor at the rates of 3.2 kg./hr. and 13 liters/hr. respectively. A polymerizable reaction composition was obtained in homogenous phase by mixing the above liquid materials. The inside wall of the reactor was scraped with the vanes rotating at 20 r.p.m. Simultaneously, the medium composition (consisting of tert-butyl alcohol, 24; water, 74; ethylene, 2 weight percent respectively) being in concentration equilibrium with the polymerizable reaction composition was flown down along the inner surface of the reactor at a flow rate of 200 liters/hr. Irradiating gamma rays from Co-60 of 100,000 curies at a dose rate of $2.0 \times 10^5$ rad/hr. under a reaction pressure of 300 kg./cm.$^2$ thus, fine powder polyethylene with a molecular weight of $6.5 \times 10^4$ and a density of 0.937 g./cm.$^3$ was produced at the rate of 135 g./hr. in the state of suspension in the aqueous solution of tert-butyl alcohol. After continuous operation for 120 hours, the quantity of polymer sticking to the inner surface of the reactor was less than 0.01 g./cm.$^2$, and the operation, of course, was not interrupted by the sticking of polymer, furthermore, it was recognized that continuous operation for a longer time would be possible.

Example 3

The same equipment as in Example 2 was used. Ethylene and an aqueous solution containing tert-butyl alcohol of 84 weight percent mixed with di-isopropyl peroxycarbonate as a reaction initiator in the ratio of 0.1 g./liter were flown into the reactor at the rate of 3.2 kg./hr. and 13 liters/hr. respectively. A polymerizable reaction composition was obtained in homogeneous phase by mixing the above liquid materials. The inside wall of the reactor was scraped with the vane rotating in the proximity of the wall at the rate of 20 r.p.m. Simultaneously, the medium composition (consisting of tert-butyl alcohol, 24; water, 74; ethylene, 2 weight percent respectively) being in concentration equilibrium with the polymerizable reaction composition was flown down along the inner surface of the reactor at a flow rate of 200 liters/hr. Under a reaction pressure of 350 kg./cm.$^2$ at 50° C., fine powder polyethylene with a molecular weight of $2.0 \times 10^4$ and a density of 0.934 k./cm.$^3$ was produced at the rate of 75 g./hr. in the state of suspension in the aqueous solution of tert-butyl alcohol. After continuous operation for 20 hours, the quantity of polymer sticking to the inner surface of the reactor was very small and could not be measured quantitatively.

Example 4

The same equipment as in Example 2 was used. Ethylene and an aqueous solution comprising tert-butyl alcohol of 75.8 weight percent, vinyl acetate of 10.4 weight percent and water of 13.8 weight percent were simultaneously flown into the reactor at the rates of 3.0 kg./hr. and 13 liters/hr. respectively. A polymerizable reaction compound was obtained in homogeneous phase by mixing the above liquid materials. The inside wall of the reactor was scraped with the vanes rotating at a rate of 20 r.p.m. Simultaneously, the medium composition being in concentration equilibrium with the polymerizable reaction composition was flown down along the inner surface of the reactor at the flow rate of 200 liters/hr. The medium composition was produced by preparing an initial mixture comprising tert-butyl alcohol of 20 weight percent, vinyl acetate of 5 weight percent and water of 75 weight percent, and introducing ethylene under pressure into the mixture until the pressure reached 300 kg./cm.$^2$. After the use of the medium composition with circulation, it reached a perfect equilibrium state with the reaction compond. Irradiating with gamma rays from Co-60 of 100,000 curies at a dose rate of $2.0 \times 10^5$ rad/hr. under the reaction pressure of 300 kg./cm.$^2$ produced a copolymer powder of ethylene and vinyl acetate at the rate of 175 g./hr. in the state of suspension in the mixed aqueous solution of tert-butyl alcohol and vinyl acetate. After continuous operation for 20 hours, the quantity of polymer sticking to the inner surface of the reactor was very small and could not be measured quantitatively.

Example 5

The same reaction apparatus as in Example 2 was employed. Forty (40) liters of the water-rich mixture consisting of 98% by weight of 10% by weight aqueous solution of methanol and 2% by weight of methyl methacrylate was placed in the separator. Then, into the reactor, were introduced methyl methacrylate at a rate of 7 liters/hr., the aqueous solution containing 50% by weight of methanol at the rate of 11 liters/hr. and simultaneously along the inside wall of the reactor said water-rich mixture at a rate of 200 liters/hr. These components mixed and then separated into two phases, that is, a reaction composition which is rich in methyl methacrylate and methanol, and a water-rich medium composition which is in equilibrium state with said reaction composition. The inside wall of polymerization reactor was scraped by the wings rotating at 100 r.p.m. which were installed in proximity to the inside wall. The medium composition in equilibrium state with the reaction composition was flowed down at the rate of 200 liters/hr. along the inside walls of the reactor.

Polymerization was carried out under atmospheric pressure and at room temperature by irradiation with gamma rays at $2.0 \times 10^5$ rad/hr. from $10^5$ curies Co-60. Polymer was obtained at the rate of 140 g./hr. After the continuous operation for 30 hours, the amount of the adhered polymer onto the inside walls of reactor was too small to be measured.

Example 6

The same reaction apparatus as in Example 2 was employed. Forty (40) liters of the water-rich mixture consisting of 98% by weight of 15% by volume aqueous solution of 1-propanol and 2% by weight of styrene was placed in the separator. Then, into the reactor, were introduced styrene monomer at the rate of 8 liters/hr., the aqueous solution containing 30% by volume of 1-propanol at the rate of 7 liters/hr. and simultaneously along the inside wall of the reactor said water-rich mixture at a rate of 200 liters/hr. These components mixed and then separated into two phases, that is, a reaction composition which is rich in styrene monomer and 1-propanol, and a water-rich medium composition which is in equilibrium state with said reaction composition. The inside wall of polymerization reactor was scraped by the wings rotating at 100 r.p.m. which were installed in proximity to the inside wall. The medium composition in equilibrium state with the reaction composition was flowed down at a rate of 200 liters/hr. along the inside walls of the reactor.

Polymerization was carried out under atmospheric pressure and at room temperature by irradiation with gamma rays at $2.0 \times 10^5$ rad/hr. from $10^5$ curies Co-60. Polymer was obtained at the rate of 50 g./hr. After the continuous operation for 30 hours, the amount of the adhered polymer onto the inside walls of reactor was too small to be measured.

What is claimed is:

1. A process for liquid phase polymerizing a polymerizable olefin monomer in the presence of a liquid reaction medium comprising an organic medium and water in a polymerization reactor comprising
    forming two liquid phases containing said polymerizable monomer, said organic medium and water, one being a monomer-rich phase and the other being a monomer-lean phase, the latter being denser than the former,
    employing said monomer-rich phase as the polymerization medium and
    employing said monomer-lean phase to flow down the reactor during the course of polymerization in such a manner that said monomer-lean phase covers the inside walls of the polymerization reactor,
    wherein said monomer-lean phase
        (a) is in physico-chemical equilibrium with said polymerization medium,
        (b) has less affinity for the resulting solid polymer than said polymerization medium and
        (c) contains polymerizable monomer in a concentration low enough to prevent substantial polymerization.

2. The process of claim 1 wherein said monomer-lean phase also contains a small amount of a water-soluble polymerization inhibitor which is insoluble in the organic meduim.

3. A process as set forth in claim 1, in which said polymerizable monomer is selected from the group consisting of ethylene, propylene, 1-butene, styrene, acrylonitrile, vinyl acetate, vinyl chloride, vinyl fluoride, vinylidene chloride, a lower-alkyl methacrylate and a lower-alkyl acrylate.

4. A process as set forth in claim 1, in which said organic medium is selected from the group consisting of acetaldehyde, ethanol, iso-propanol, methanol, $\beta$-oxyethylmethyl ether, morpholine, acetone, acetonitrile, acetic acid, propionic acid, n-propanol, tert-butanol, pyridine, tri-methylamine, tri-ethyl phosphate, sec-butanol, methylal, methyl ethyl ketone, and propionaldehyde.

5 A process as set forth in claim 1, in which polymerization is proceeded by means of an ionizing radiation, a radical initiator or the concomittant use thereof.

6. A process as set forth in claim 1, which said polymerizable monomer is methyl methacrylate.

7. A process as set forth in claim 1, in which said organic medium is a lower-alkanol.

8. A process as set forth in claim 1 in which said medium composition comprises a lower-alkanol, water and at least one species of monomer selected from the group consisting of ethylene, vinyl acetate, methyl methacrylate, and styrene.

9. A process as set forth in claim 1, in which said medium composition comprises tert-butanol, water, ethylene and a copolymerizable vinyl monomer.

10. A process as set forth in claim 1, in which said medium composition comprises methanol, water and a monomer selected from propylene and methyl methacrylate.

11. A process as set forth in claim 1, in which said medium composition is prepared by the steps which comprise mixing a composition substantially consisting of an organic medium, water and a small amount of a polymerizable monomer or monomers in a mixing ratio which is estimatedly similar to the mixture ratio of the resulting medium composition, with a composition substantially consisting of the monomer or monomers and the organic medium, and obtaining a medium composition which is in physico-chemical equilibrium state with the resulting reaction composition.

References Cited

UNITED STATES PATENTS

| | | | |
|---|---|---|---|
| 3,350,377 | 10/1967 | Norwood | 260—88.2 B |
| 2,475,628 | 7/1949 | McSweeney | 260—94.9 A |
| 2,475,643 | 7/1949 | Seebold | 260—94.9 A |

FOREIGN PATENTS

| | | | |
|---|---|---|---|
| 1,071,790 | 6/1967 | Great Britain | 260—94.9 P |

JAMES A. SEIDLECK, Primary Examiner

A. HOLLER, Assistant Examiner

U.S. Cl. X.R.

260—88.2 B, 88.2 C, 88.7 D, 88.7 F, 88.7 G, 89.1, 86.7, 92.1, 92.8, 93.7, 94.9 R, 94.9 A, 94.9 P; 23—285